(12) United States Patent
Billeci et al.

(10) Patent No.: US 7,082,550 B2
(45) Date of Patent: Jul. 25, 2006

(54) METHOD AND APPARATUS FOR MIRRORING UNITS WITHIN A PROCESSOR

(75) Inventors: Michael Billeci, Poughkeepsie, NY (US); Chung-Lung K. Shum, Wappingers Falls, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 10/435,914

(22) Filed: May 12, 2003

(65) Prior Publication Data

US 2004/0230856 A1 Nov. 18, 2004

(51) Int. Cl.
*G06F 11/16* (2006.01)
(52) U.S. Cl. .................. 714/11; 713/300; 713/500; 714/10; 714/25; 714/28; 714/30
(58) Field of Classification Search .................. 714/1, 714/2, 11, 25, 36, 47, 726, 10, 28, 30; 327/158; 713/1, 100, 300, 500
See application file for complete search history.

(56) References Cited

U.S. PATENT DOCUMENTS

| 5,692,121 | A | | 11/1997 | Bozso et al. ............ 395/182.11 |
|---|---|---|---|---|
| 5,802,359 | A | | 9/1998 | Webb et al. ................. 395/568 |
| 6,055,661 | A | * | 4/2000 | Luk ............................ 714/736 |
| 6,498,524 | B1 | * | 12/2002 | Kawasaki et al. .......... 327/158 |
| 6,895,540 | B1 | * | 5/2005 | Chen et al. .................. 714/726 |
| 2003/0182594 | A1 | * | 9/2003 | Watkins et al. ............... 714/11 |
| 2005/0005203 | A1 | * | 1/2005 | Czajkowski ................. 714/47 |

* cited by examiner

*Primary Examiner*—Thomas Lee
*Assistant Examiner*—Erin L. Dogan
(74) *Attorney, Agent, or Firm*—Lynn Augspurger; Cantor Colburn LLP

(57) ABSTRACT

A processor responsive to a clock cycle includes a base-unit, a mirror-unit that is a duplicate instance of the base-unit, a non-duplicate-unit in signal communication with the base and mirror units, a first staging register disposed at the input to the mirror-unit for delaying the input signal thereto by at least one clock cycle, and a second staging register disposed at the output of the mirror-unit for delaying the output signal therefrom by at least one clock cycle. The non-duplicate-unit includes a comparator for comparing the output signals of the base and mirror units.

12 Claims, 2 Drawing Sheets

METHOD AND APPARATUS FOR MIRRORING UNITS WITHIN A PROCESSOR

RELATED APPLICATIONS

The present application is related to the co-pending U.S. patent application Ser. No. 10/436,210 "Method and Apparatus for Controlling Clocks in a Processor with Mirrored Units" filed by Timothy McNamara, Michael Billeci, David Webber and Ching L. Tong.

The co-pending application and the present application are owned by one and the same assignee, International Business Machines Corporation of Armonk, N.Y. The descriptions set forth in the co-pending application are hereby incorporated into the present application by this reference.

Trademarks: IBM® is a registered trademark of International Business Machines Corporation, Armonk, N.Y., U.S.A. S/390, Z900 and z990 and other product names may be registered trademarks or product names of International Business Machines Corporation or other companies.

BACKGROUND OF THE INVENTION

The present disclosure relates generally to a method and apparatus for mirroring units within a processor, and particularly to a method and apparatus for mirroring instruction and execution units within a processor for implementing error detection hardware and for preserving valuable real estate at the processor core level.

Errors may occur in computer hardware that may be transient errors occurring once, randomly, or never again, or they may be "hard" errors, such as when a hardware component breaks and stays broken. Given that hardware can have errors, it is necessary that these errors can be detected. The duplication of instruction and execution units, I-units and E-units, respectively, within the core of a processor chip of a computer system to provide fault detection is well known, where the duplicated units include duplicate instances referred to as base-units and mirrored-units. The outputs of each of these units are sent to a recovery unit (R-unit) where the values of both are compared. A mismatch indicates a hardware fault and the appropriate error recovery action is taken. The outputs of the base and mirror units are also compared in a buffer control element (BCE), with detected errors being forwarded to the R-unit to initiate the appropriate recovery action.

In a processor that implements error detection, the first goal should be protecting the integrity of the data. That is to say, the processor should not allow a "wrong" answer to propagate undetected. At the very least, the processor should checkstop, or present a machine check to the operating system to inform that an error has been detected. More sophisticated processors will implement some type of recovery scheme, such that when an error is detected, the processor will back-up to the last known good instruction and retry the failing operation. The hardware constructs required to provide this level of detection come at a cost in terms of extra circuits, which impacts wireability and cycle time. Some processors will intersperse the error detection logic in with the functional logic. An undesirable result of this implementation is that the required silicon area increases with the amount of error detection. Also, some of the error detection logic can be quite complex, which greatly adds to the development time and cost. To overcome these disadvantages, some processors duplicate sections of logic, and even duplicate entire functional units. In a duplicate implementation, the surrounding units look for discrepancies in the results generated by the duplicated units. This duplicate implementation is desirable in that it decreases complexity and thereby decreases development time, but comes at the cost of increased silicon area, where full duplication will double the silicon area required. Since the duplicated units each need to communicate with the other functional units, they must all be floorplanned close together. This increases wire congestion in the core of the processor increases wire length, and decreases processor frequency.

As cycle time requirements of the processor become more and more aggressive, reaching in excess of 1 Giga-Hertz (GHz), the connecting wires between the mirror units, which are used only for error checking, and other units must be short, thereby requiring that the mirror units be floorplanned at the core level close to the base units, R-unit, and BCE. Also, the mirror-units along with the base-units must be floorplanned in the middle of the processor core. As a result, it is becoming more and more difficult to manage the resulting wire congestion at the core level. Accordingly, there is a need in the art for an improved method and apparatus for mirroring units within a processor.

SUMMARY OF THE INVENTION

In one embodiment, a processor responsive to a clock cycle includes a base-unit, a mirror-unit that is a duplicate instance of the base-unit, a non-duplicate-unit in signal communication with the base and mirror units, a first staging register disposed at the input to the mirror-unit for delaying the input signal thereto by at least one clock cycle, and a second staging register disposed at the output of the mirror-unit for delaying the output signal therefrom by at least one clock cycle. The non-duplicate-unit includes a comparator for comparing the output signals of the base and mirror units.

In another embodiment, a method of cycling a processor includes running a mirror-unit one cycle later than its associated base-unit, perceiving at a non-duplicate-unit that the mirror-unit is running two cycles behind its associated base-unit, and realigning the mirror and base unit signals at the non-duplicate-unit for comparison.

In a further embodiment, a processor includes a base functional core and a non-functional instance area. The base functional core includes a base-unit of a duplicated unit and a non-duplicated unit, the base-unit being in signal communication with the non-duplicated unit. The non-functional instance area includes a mirror-unit of the duplicated unit, the mirror-unit being in signal communication with the base functional core. A register bank is disposed between the base functional core and the mirror-unit, whereby signals received at the mirror-unit are delayed at the register bank by at least one clock cycle with respect to signals received at the base-unit.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the present invention provides a processor with asymmetrical mirroring of units for preservation of valuable processor real estate.

Figure 1:
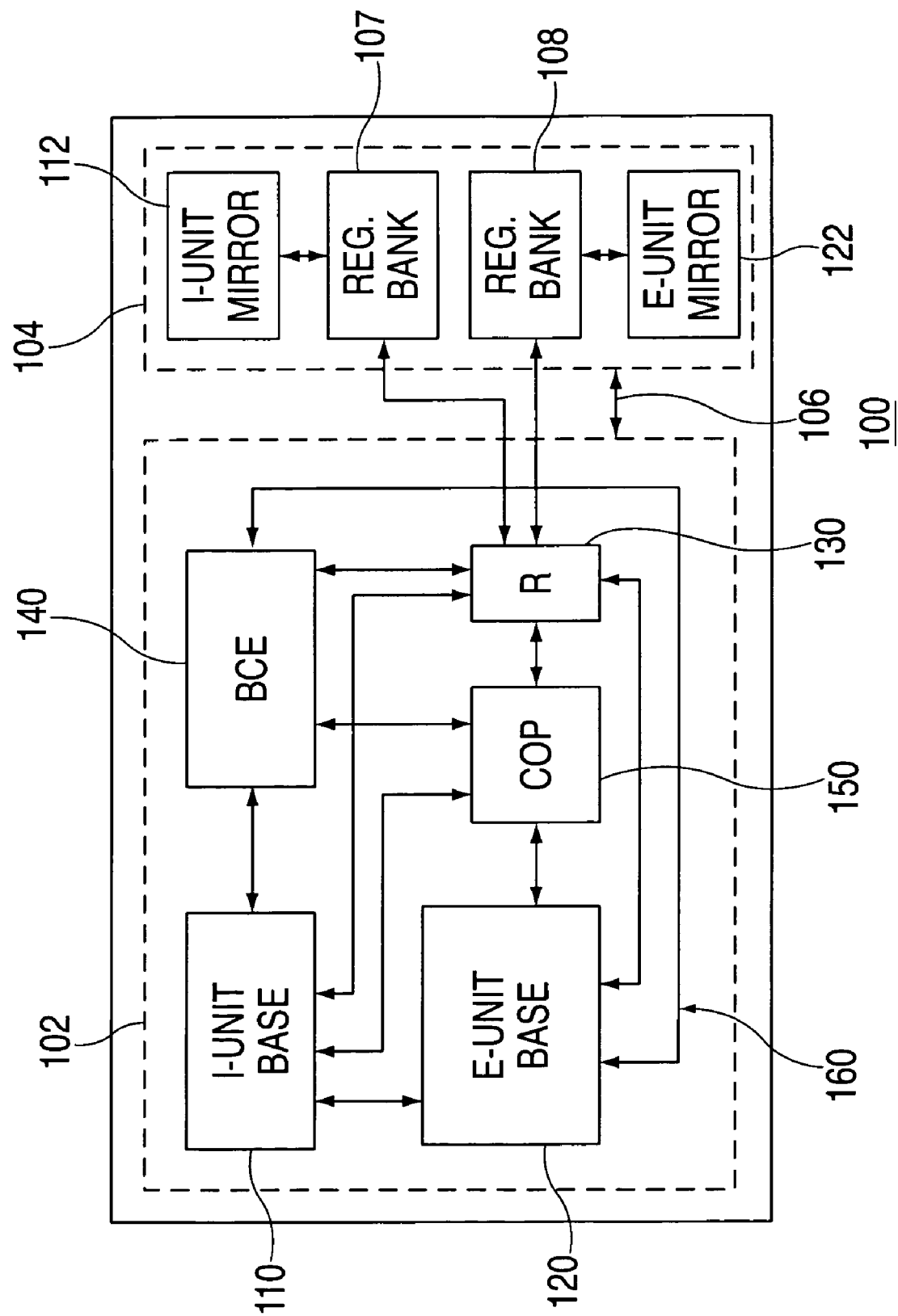
FIG. 1 depicts a one-line diagram of an exemplary processor for implementing an embodiment of the invention.

FIG. 1 is an exemplary embodiment of a processor 100 that may be employed in a server, for example. Within processor 100 is a base functional core 102 and a non-functional instance area 104, with communication occurring between the two areas as depicted generally at signal path 106. Base functional core 102 includes base units of duplicated units, and non-duplicated units. A duplicated unit is a unit, such as an instruction-base-unit (I-base-unit) 110 or an execution-base-unit (E-base-unit) 120, that is instantiated twice for purposes of error detection. The first instance of a duplicated unit is referred to as a base unit and the second instance is referred to as a mirror unit, which are discussed further below. A non-duplicated unit is a unit, such as a recovery-unit (R-unit) 130, a buffer control element (BCE) 140, or a compression-unit (COP) 150, that is not copied for error detection. Non-duplicated units are often used for comparing the results of duplicated units. Within base functional core 102, I-base-unit 110 provides a decoded instruction on an instruction fetch, E-base-unit 120 executes an issued instruction, R-unit 130 holds the machine state and provides system data in the event of an error, BCE 140 serves as a cache and cache controller, and COP 150 implements data compression and character translation, with interconnecting signal paths 160 depicted in one-line diagram form. In addition to base units, a duplicated unit includes a mirror unit, such as I-mirror-unit 112 and E-mirror-unit 122, which are non-functional instances of the respective duplicated unit used for error detection. In accordance with the above, exemplary duplicated units include I-units and E-units, with I-base-unit 110 and I-mirror-unit 112, and with E-base-unit 120 and E-mirror-unit 122, respectively. In an embodiment, non-functional instance area 104 also includes staging registers 107, 108, which will be discussed below in reference to FIG. 2. The communication between base units 110, 120, mirror units 112, 122 and non-duplicated units, such as R-unit 130, will now be discussed with reference to FIG. 2.

Figure 2:
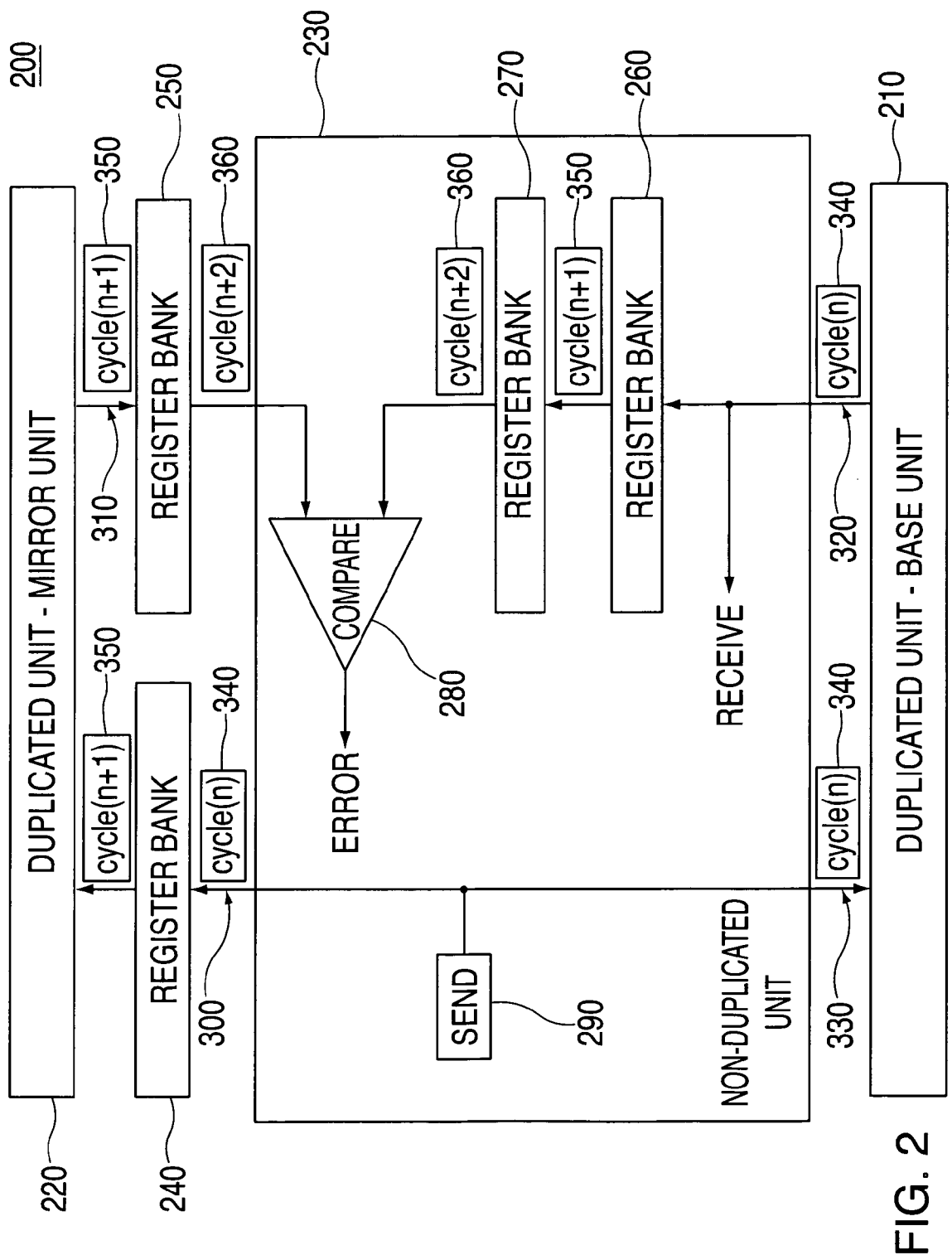
FIG. 2 depicts an exemplary base-mirror arrangement in accordance with an embodiment of the invention for use in the exemplary processor of FIG. 1.

FIG. 2 depicts a base-mirror arrangement 200 of a duplicated unit having a base-unit 210, a mirror-unit 220, a non-duplicated-unit 230 (also referred to as an R-unit 230 and depicted as R-unit 130 in FIG. 1), a first staging register 240 disposed in the input signal path 300 to mirror-unit 220, and a second staging register 250 disposed in the output signal path 310 from mirror-unit 220. In an embodiment, staging registers 240, 250 are floorplanned at the core level of processor 100, while the signals between base-unit 210 and R-unit 230 are connected directly. As illustrated, FIG. 2 depicts base-mirror arrangement 200 in one-line diagram form, however, staging registers 240, 250 represent staging registers on all inputs and outputs of mirror-unit 220, as depicted by register banks 107, 108 in FIG. 1. Base-mirror arrangement 200 may apply to a duplicated I-unit, where base-unit 210 would represent an instruction-base-unit 110 and mirror-unit 220 would represent an instruction-mirror-unit 112. Alternatively, base-mirror arrangement 200 may apply to a duplicated E-unit, where base-unit 210 would represent an execution-base-unit 120 and mirror-unit 220 would represent an execution-mirror-unit 122. In either arrangement, non-functional-unit 230 would represent an R-unit 130. In an embodiment of the invention, processor 100 includes base-mirror arrangements 200 for each I-unit 110 and E-unit 120.

R-unit 230 includes third and fourth intra-unit staging registers 260, 270 serially disposed in the output signal path 320 of base-unit 210. Also included in R-unit 230 is a comparator 280 disposed to receive signals from the mirror-unit output signal path 310, via second staging register 250, and from the base-unit output signal path 320, via third and fourth staging registers 260, 270, to provide fault detection through signal comparison. A mismatch in machine state detected at comparator 280 indicates a hardware fault, with appropriate error recovery action being taken.

During cycling of the processor clock (not shown), a send signal 290 is received at the input signal path 330 at base-unit 210, and at the input signal path 300 at first staging register 240. At the same clock cycle, represented by cycle (n) 340, base-unit 210 outputs the send signal 290 on output signal path 320 to third staging register 260 at R-unit 230. One clock cycle later, represented by cycle(n+1) 350, mirror unit 220 receives the send signal 290 on input signal path 300 from first staging register 240 and outputs the send signal 290 on output signal path 310 to second staging register 250, and third staging register 260 delivers the send signal 290 to fourth staging register 270. One more clock cycle later, represented by cycle(n+2) 360, second staging register 250 outputs the send signal 290 on output signal path 310 to comparator 280 at R-unit 230, and fourth staging register 270 outputs the send signal 290 to comparator 280. At each clock cycle, comparator 280 compares the received signals to determine if they are the same or different. Since the send signal 290 was delayed by two clock cycles as it traversed first and second staging registers 240, 250 via mirror-unit 220 (one clock cycle delay per staging register), and was delayed by two clock cycles as it traversed third and fourth staging registers 260, 270 via base-unit 210 (one clock cycle delay per staging register), the two signals at comparator 280 should be the same, with a miscompare indicating a hardware fault.

By delaying the signals to and from mirror-units 220, depicted as a single mirror-unit 220 in FIG. 2 but representative of one or more mirror-units, the mirror-unit signals become less timing critical. As illustrated, the signals between the mirror-units 220 and the R-unit 230 are no longer one-cycle paths, but are now two-cycle paths, which provides greater flexibility for the placement of the mirror-units within the processor core. For example, mirror-units 220, which are used only for error checking, may be moved away from base-units 210 to less costly real estate, and base-units 210 may be moved closer to each other than to their respective mirror-units 220, thereby resulting in cycle time improvement with less wire congestion in the base area of the core of processor 100. Additionally, base-units 210 may be located closer to R-unit 230 than to their respective mirror-units 220. Delaying the signals to and from mirror-units 220 relative to the base-units 210 is referred to in the art as asymmetrical mirroring. In contrast, a processor core 100 with symmetrical mirroring refers to an arrangement where the base-units 210 and mirror-units 220 are clocked together.

In accordance with an embodiment of the invention, mirror-units 220 are logically running one cycle later than base-units 210, and with staging registers 240, 250 on both inputs and outputs between mirror-units 220 and R-unit 230, R-unit 230 logically perceives that mirror-units 220 are running two cycles behind base-units 210. To compensate for this mismatch, R-unit 230, via staging registers 260,270 realigns the base and mirror units prior to checking at comparator 280. Even though the signals from base-units 210 may be used upon receipt for functional purposes, these same signals go through a two-cycle delay in order to be realigned with the corresponding mirror-unit signals. As a result, a miscompare on the signals received from the base and mirror units 210, 220 will be detected two cycles later than the occurrence of the miscompare event, which is still within the depth of the checkpoint pipeline and does not result in a loss of recoverability.

In an alternative embodiment, low priority functions, such as hardware trace facilities for example, may be sourced from the mirror-units 220 rather than from the base-units 210. By utilizing such an arrangement, less costly wires and wire connections at the mirror-units 220 can be used for low priority functions, leaving the expensive wires and wire connections at the base-units 210 for higher priority functions.

In an alternative embodiment, the staging registers that are used to align signals from the base-units may be in an encoded form (such as parity, for example), thereby saving processor real estate. When used in this manner, the staging registers of parities will then be aligned as disclosed herein and checked against the signals from the mirror units as discussed above.

Some embodiments of the invention improve wireability and cycle time on processors that implement duplicated functional units for the purpose of error detection, as herein disclosed, by moving the mirror units to the edges of the core, where wire congestion is typically not an issue, and by implementing staging registers to solve the wire length (cycle time) problem of moving the mirror units far from the base and non-duplicated (checking) units. As disclosed herein, the units within the base functional core may be floorplanned as close together as possible to minimize wire length of unit-to-unit paths, thereby achieving fast cycle times, and the mirror units may be moved away from the central core to the edges of the core, thereby reducing wire congestion.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A processor responsive to a clock cycle, comprising:
   a plurality of base units, each for providing an output signal in response to an input signal;
   a plurality of mirror units, each for providing an output signal in response to the input signal, the mirror-unit being a duplicate instance of the base-unit;
   a first staging register disposed at the input to the mirror-unit for delaying the input signal thereto by at least one clock cycle;
   a second staging register disposed at the output of the mirror-unit for delaying the output signal therefrom by at least one clack cycle; and
   a non-duplicated-unit in signal communication with a plurality of base units and a plurality of mirror units, the non-duplicated-unit having a comparator for comparing the output signals of the plurality of base and mirror units;
   wherein the plurality of mirror units are utilized for detecting errors within the processor and are located away from the plurality of base units to improve cycle time with minimal wire congestion.

2. The processor of claim 1, wherein the non-duplicated-unit comprises a recovery-unit, and further comprising:
   third and fourth staging registers serially disposed between the base-unit and the comparator for delaying the output signal of the base-unit by at least two clock cycles.

3. The processor of claim 2, wherein:
   the base-unit, the mirror-unit and the non-duplicated-unit define a first processor core having asymmetrical mirroring;
   wherein the base-unit and non-duplicated unit in the first processor core are floorplanned closer together than the base-unit and non-duplicated unit in a second processor core, the second processor core having the base-unit, the mirror-unit, the non-duplicated-unit and symmetrical mirroring.

4. The processor of claim 1, wherein:
   the plurality of base units and the plurality of mirror units each comprise at least one of instruction-units, execution-units, or any combination thereof.

5. The processor of claim 1, wherein the plurality of base units and the plurality of mirror units each comprise instruction-units, and each further comprising:
   an execution-base-unit and an execution-mirror-unit.

6. The processor of claim 5, wherein:
   each input of each of the plurality of mirror units has a first staging register, and each output of each of the plurality of mirror units has a second staging register.

7. A method of cycling a processor, comprising:
   providing an output signal in response to an input signal via a base-unit;
   providing an output signal in response to the input signal via a mirror-unit, the mirror-unit being a duplicate instance of the base-unit;
   running a plurality of mirror-units one cycle later than a plurality of base-units, respectively;
   perceiving at a non-duplicated-unit that the plurality of mirror-units are running two cycles behind the plurality of base-units, respectively; and
   realigning a plurality of mirror-unit and base-unit signals at the non-duplicated-unit for comparison;
   wherein the plurality of mirror-units are utilized for detecting errors within the processor and are located away from the plurality of base-units to improve cycle time with minimal wire congestion.

8. The method of claim 7, further comprising:
   detecting a miscompare on the signals received from the plurality of mirror-units and plurality of base-units at least two cycles later than the occurrence of the miscompare event.

9. The method of claim 7, further comprising:
   sourcing a low priority function signal from the mirror unit.

10. A processor, comprising:
a base functional core comprising a base-unit of a duplicated unit and a non-duplicated unit, the base-unit being in signal communication with the non-duplicated unit;
a non-functional instance area comprising a mirror-unit of the duplicated unit, the non-functional instance area being in signal communication with the base functional core; and
a register bank disposed between the base functional core and the mirror-unit;
wherein signals received at the mirror-unit are delayed at the register bank by at least one clock cycle with respect to signals received at the base-unit; and
wherein the mirror-unit is utilized for detecting errors within the processor and is located away from the base-unit to improve cycle time with minimal wire congestion.

11. The processor of claim 10, wherein:
the non-duplicated unit comprises a comparator, and a second register bank disposed between the comparator and the base-unit;
wherein signals received at the comparator from the base-unit are delayed at the second register bank by at least one clock cycle, thereby aligning the base-unit signals received at the comparator with the delayed mirror-unit signals received at the camparator.

12. The processor of claim 11, wherein:
the second register bank is in an encoded form, thereby reducing processor real estate usage.

* * * * *